United States Patent [19]
Lebby et al.

[11] Patent Number: 5,959,315
[45] Date of Patent: Sep. 28, 1999

[54] SEMICONDUCTOR TO OPTICAL LINK

[75] Inventors: Michael S. Lebby, Chandler; Christopher K. Y. Chun, Mesa, both of Ariz.

[73] Assignee: Motorla, Inc., Schaumburg, Ill.

[21] Appl. No.: 07/844,027

[22] Filed: Mar. 2, 1992

[51] Int. Cl.⁶ .................................................. H01L 33/00
[52] U.S. Cl. .................. 257/98; 257/88; 257/94
[58] Field of Search .................. 257/98, 88, 94

[56] References Cited

U.S. PATENT DOCUMENTS

| | | | |
|---|---|---|---|
| 4,170,399 | 10/1979 | Hansen et al. | 350/96.2 |
| 4,186,996 | 2/1980 | Bowen et al. | 350/96.2 |
| 4,329,190 | 5/1982 | Berg et al. | 156/60 |
| 4,376,946 | 3/1983 | Kaminow et al. | 357/17 |
| 4,473,747 | 9/1984 | Brogårdh et al. | 250/231 R |
| 4,915,470 | 4/1990 | Moore et al. | 350/96.2 |
| 4,995,687 | 2/1991 | Nagai et al. | 350/96.2 |
| 5,260,587 | 11/1993 | Sato | 257/98 |

FOREIGN PATENT DOCUMENTS 58-44778  3/1983  Japan .

*Primary Examiner*—Valencia Martin-Wallace
*Attorney, Agent, or Firm*—Eugene A. Parsons; William E. Koch

[57] ABSTRACT

One surface of a semiconductor component attached to one surface of a header with an opposite surface of the component having an optical input/output positioned adjacent one end of an optical fiber. The component and optical fiber are fixedly attached with no strain by a curable gel with the header acting as a heat sink. Electrical contacts are made to the component by means of leads formed on the header and/or a conductive coating deposited on the optical fiber.

10 Claims, 2 Drawing Sheets

5,959,315

SEMICONDUCTOR TO OPTICAL LINK

FIELD OF THE INVENTION

The present invention relates, in general, to semiconductor to optical links and more specifically to fixturing semiconductor components to an optical communication medium to form a semiconductor to optical link.

BACKGROUND OF THE INVENTION

Optical communication systems today utilize semiconductor components that are partitioned independently from an optical communication medium. By way of example, optical fibers are connected in such a manner that makes them compatible with equipment that contains optical semiconductor components. Unfortunately, this partitioning forces an extreme alignment specification on both the connector and the connectorized equipment thus making the procedure expensive.

Traditionally, the alignment of semiconductor light components inside equipment for connection to an optical fiber has been a difficult task. Typically, two critical steps in optical alignment are maximizing coupling efficiency and affixing of an optical semiconductor component in an exact position after alignment is achieved. Optical alignment which maximizes coupling efficiency is completed by a process called active alignment. The active alignment process is a technique that positions optical semiconductor components with an optical fiber as a signal is being passed through. Active alignment is a labor intensive task and is not applicable to mass production of optical couplers and is consequently expensive. Once the optical semiconductor component is aligned to the optical fiber, the optical semiconductor component and the optical fiber must be locked in place with minimal movement. Several current affixing methods or processes include epoxies, laser welding, and low melting-point solder. However, heat developed during these affixing process causes both the optical semiconductor and optical fiber components to expand and contract during cooling, thus causing a misalignment and reduces coupling efficiency.

Therefore, it is desirable to utilize a method to optimize coupling of optical signals between optical semiconductor components and optical fibers which increases performance and reduces manufacturing costs.

SUMMARY OF THE INVENTION

The above and other problems are substantially reduced through the use of a method of forming semiconductor to optical links including the steps of providing a semiconductor component having an optical input/output and first and second electrical connections, providing an optical fiber with an input/output approximately the same size as the optical input/output of the semiconductor component, providing a header with at least some electrically conductive material thereon, fixing the semiconductor component to the header with the optical input/output directed outwardly away from the header, positioning the input/output of the optical fiber in alignment with the input/output of the semiconductor component so as to form an optical junction therebetween, and applying a curable gel to the junction and curing the gel to fix the optical fiber to the semiconductor component.

The above and other problems are substantially reduced by a semiconductor to optical link including a semiconductor component having an optical input/output and first and second electrical connections, an optical fiber with an input/output approximately the same size as the optical input/output of the semiconductor component, a header with at least some electrically conductive material thereon fixed to the semiconductor component with the optical input/output of the semiconductor component directed outwardly away from the header, and the optical fiber fixed to the semiconductor component, with the input/output of the optical fiber in alignment with the input/output of the semiconductor component so as to form an optical junction therebetween, by a curable gel at the junction.

BRIEF DESCRIPTION OF THE DRAWINGS

Referring to the drawings.

DESCRIPTION OF THE PREFERRED EMBODIMENTS

Figure 1:
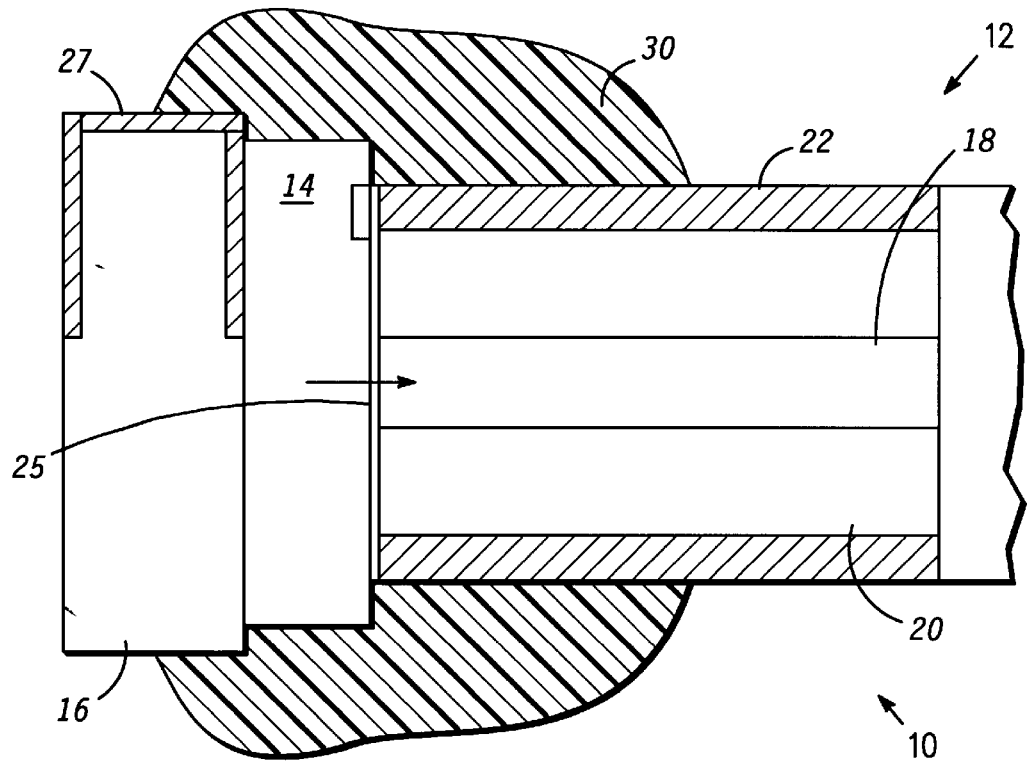
FIG. 1 is a view in side elevation, portions thereof broken away and shown in section, of a semiconductor to optical link in accordance with the present invention.

Referring specifically to FIG. 1, a semiconductor to optical link 10 is illustrated in accordance with the present invention. Link 10 includes an optical fiber 12, a semiconductor component 14 and a header 16. Optical fiber 12 includes a core 18, or light transmitting portion, and cladding 20 surrounding the core for protection and to reduce light losses. In this specific embodiment optical fiber 12 is a single mode fiber in which core 18 has a diameter in the range of approximately 1 micron to 6 microns and cladding 20 has an outer diameter approximately 125 microns. In this specific embodiment a portion of optical fiber 12 adjacent the end is pre-coated with a layer 22 of electrically conductive material, such as metal. It will of course be understood by those skilled in the art that optical fibers other than the single mode type are somewhat larger and the single mode type is utilized herein to illustrate the extremely small size of complete link which is possible.

Semiconductor component 14, in this specific embodiment is a vertical cavity surface emitting laser (VCSEL) with an optical input/output 25 positioned in optical alignment with the end of core 18 of optical fiber 12. Thus, the laser emits light directly into core 18 of optical fiber 12. Further, optical input/output 25 is approximately the same dimension as core 18 and the overall transverse dimensions of component 14 are approximately the same as the transverse dimension (diameter) of optical fiber 12. In the present technology VCSELs are approximately 250 microns by 250 microns and it is already foreseeable that this will be reduced to 125 microns by 125 microns.

Figure 4:
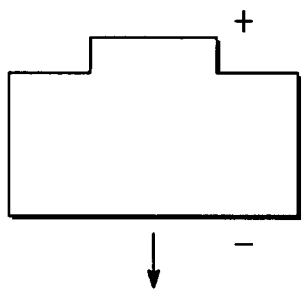
Figure 5:
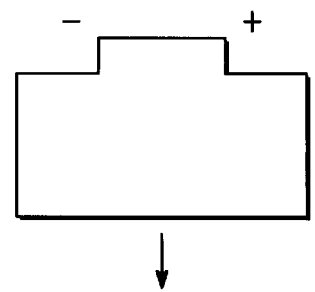

Header 16 is constructed of ceramic with a layer 27 of electrically conductive material, such as metal or the like, deposited from one surface, around the edge to the other surface. Layer 27 forms an electrical contact from one major surface of header 16 to the other, opposite, major surface. Semiconductor component 14 is fixedly attached to one of the major surfaces of header 16 by any convenient method, such as soldering, welding, adhesive, etc. In this specific embodiment semiconductor component 14 is a VCSEL with one electrical contact on the surface adjacent header 16 and in contact with layer 27 and a second electrical contact on the surface adjacent optical fiber 12 and in contact with layer 22 (see FIGS. 2 and 4, to be explained presently). Generally, when semiconductor component 14 is a VCSEL, a mesa is formed on the light emitting surface and the adjacent contact is in the form of a ring which is in continuous contact with layer 22. Further, it will be understood by those skilled in the art that electrical contact to either or both of layers 22 and 27 can be made by intimate contact, bump bonding, conductive gel, etc. Thus, external electrical connections are conveniently made to layer 27 on header 16 and layer 22 on optical fiber 12.

Optical fiber 12 is fixedly attached to semiconductor component 14 by means of a curable gel 30. Gel 30 is any convenient gel or polymer which is curable, generally at or near ambient temperature and with a minimum generation of heat. Typical curable gels which are utilized for this purpose include silicone gels, cellulose butyrate acetate, poly methyl methacrylate, cyanoacrylate, etc. Optical fiber 12 and semiconductor component 14 are aligned and gel 30 applied so as to create a minimum of strain in gel 30 during and after the curing process. This is accomplished generally because the gel curing process adds very little heat to the junction and header 16 operates as a heat sink to remove any heat that might be generated.

Figure 2:
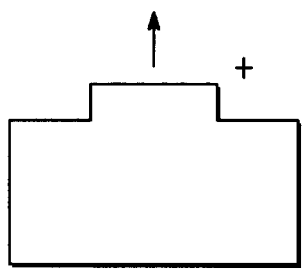
FIGS. 2 through 5 are profile views of different embodiments of vertical cavity surface emitting lasers utilized in the semiconductor to optical link of FIG. 1.
Figure 3:
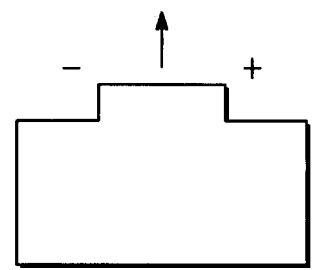

Referring to FIGS. 2 through 5, several different embodiments for vertical cavity surface emitting lasers (VCSEL) are illustrated. In FIG. 2, light is emitted upwardly from the laser (represented by the arrow). This particular laser has an electrical contact on the upper surface (represented by the "+" symbol) and an electrical contact on the lower surface (represented by the "−" symbol). The laser embodiment illustrated in FIG. 3 emits light upwardly and has both electrical contacts on the upper surface. One potential structure for using the FIG. 3 embodiment of the VCSEL is to provide an electrically conductive layer similar to layer 27 but separated longitudinally to form two separate conductors along the outer edge of the optical fiber cladding. The laser embodiment illustrated in FIG. 4 emits light downwardly and has an electrical contact on the upper and lower surface, similar to the embodiment of FIG. 2. The laser embodiment illustrated in FIG. 5 emits light downwardly and both electrical contacts are on the upper surface.

Figure 6:
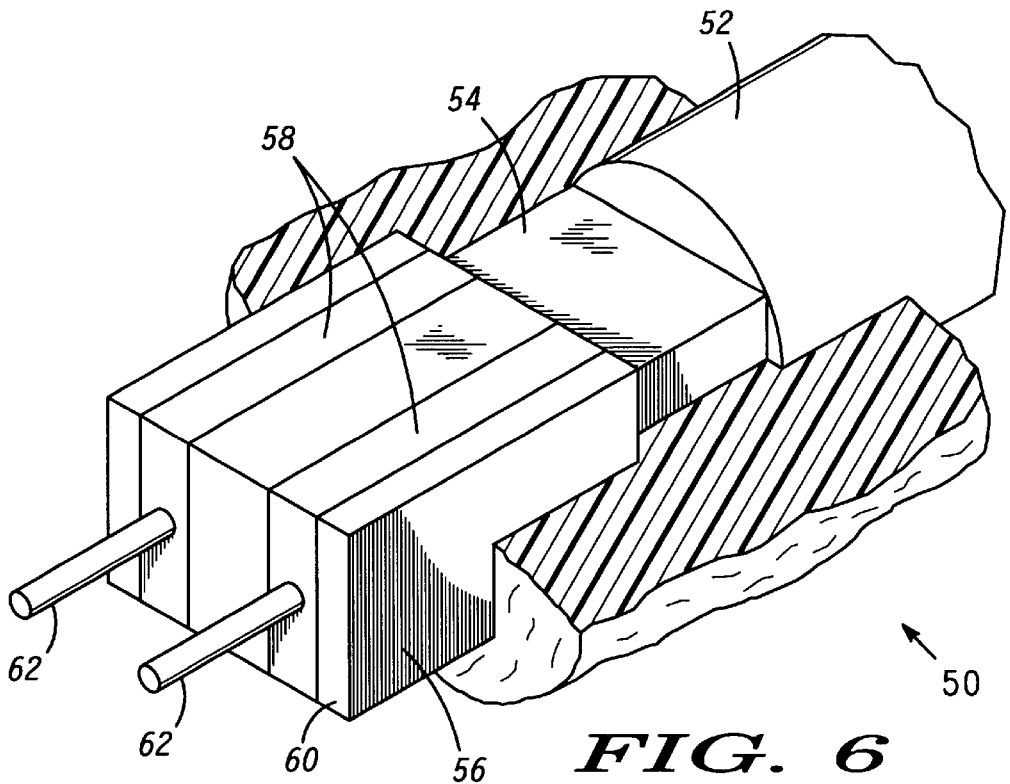
FIG. 6 is a view in perspective, portions thereof broken away and shown in section, of another semiconductor to optical link in accordance with the present invention.

Referring to FIG. 6, another embodiment of a semiconductor to optical link 50 is illustrated in accordance with the present invention. Link 50 includes an optical fiber 52, a vertical cavity surface emitting laser 54 and a header 56. In this specific embodiment laser 54 is the type of VCSEL illustrated in FIG. 5. Laser 54 is fixedly attached to a first surface of header 56 so that both electrical contacts thereof are in contact with the first surface and the light emitting surface (optical input/output) is adjacent the core of optical fiber 52. Also, header 56 is formed of semiconductor material, such as silicon with a metal layer 58 preferentially deposited thereon. Layer 58 is deposited to form a pair of separate electrical leads extending from the first surface, across the top and onto a second surface 60, opposite the first surface. A pair of electrical contacts 62 are affixed to surface 60 of header 56 so that the entire assembly is electrically connected by simply plugging it into a suitable receptacle. It should be noted that in this particular embodiment a metal coating on the optical fiber is not required for completing the electrical contacts to the laser.

Figure 7:
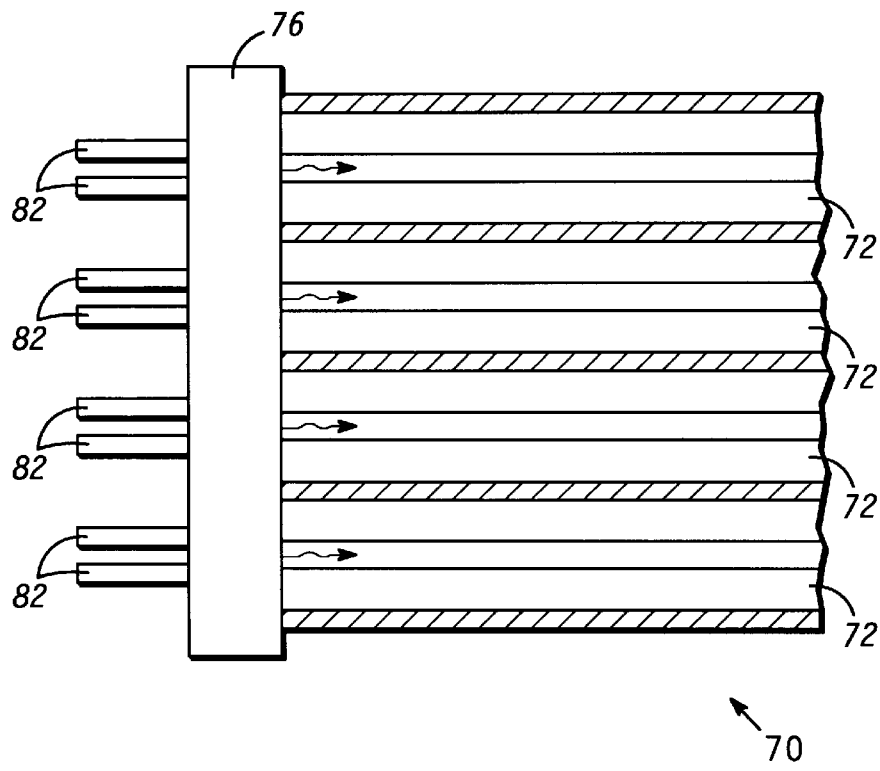
FIG. 7 is a view in top plan of a plurality of semiconductor to optical links in accordance with the present invention.

FIG. 7, is a view in top plan of an assembly 70 incorporating a plurality of semiconductor to optical links in accordance with the present invention. Assembly 70 includes a plurality of optical fibers 72, which may be individual fibers or a fiber ribbon. Further, as illustrated above a metal coating on the optical fibers may, or may not, be utilized as an electrical contact depending upon the type of semiconductor component utilized and the specific application. A header unit 76 may be a single header having electrical leads preferentially deposited thereon or a plurality of individual headers held together by a housing or other mechanical mounting unit. As a typical example, header unit 76 may be a molded plastic assembly. A pair of electrical contacts 82 is electrically connected to each semiconductor component associated with each of the headers in unit 76. Thus, assembly 70 plugs into a receptacle similar to, for example, an in-line semiconductor package and is very small compared with all prior art devices.

While the above embodiments are illustrated with VCSELs, it will be understood that any other type of laser, photo-diode, photonic component, etc can be utilized as the semiconductor component. Also, one or more semiconductor components can be formed on a single substrate, rather than individual components, and in some special instances the header can be formed as an integral unit with the semiconductor components. Further, the headers can be formed of any convenient material, e.g. ceramic, semiconductor material, metal, etc., and in any shape that will perform the desired function. Also, when utilizing semiconductor substrates it will of course be understood that heavily doped areas can be substituted for part or all of the connecting conductors.

Thus, semiconductor to optical links and methods of forming the links have been disclosed. In the disclosed links the dimensions of the entire assembly are approximately the same as the transverse dimensions of a single mode optical fiber. The semiconductor component, optical fiber and a header are fixed together with little or no strain occurring between the parts or on the material fixing the parts together. Further, convenient electrical contacts are provided so that the completed link is easily utilized in electrical circuits. The small size of the complete link provides the advantage of additional applications not previously possible and/or practical and applications in denser environments.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

What is claimed is:

1. A semiconductor to optical link comprising:

a header defining an axial direction and having dimensions transverse to the axial direction;

a semiconductor component having an optical input/output area defined in a first surface and first and second electrical connections, at least one of the first and second electrical connections being positioned in the first surface, the semiconductor component being fixed to the header with the first surface directed outwardly away from the header and substantially perpendicular to the axial direction defined by the header, the transverse dimensions of the header being approximately the same size as the first surface of the semiconductor component;

an elongated optical fiber having an end defining an optical input/output of the fiber, the end of the optical fiber having dimensions transverse to a longitudinal dimension of the optical fiber approximately the same size as the first surface of the semiconductor component; and a curable gel fixing the end of the optical fiber to the first surface of the semiconductor component, with the optical input/output of the optical fiber in alignment with the optical input/output area of the semiconductor component so as to form an optical junction therebetween.

2. A semiconductor to optical link as claimed in claim 1 wherein the curable gel includes silicone gel.

3. A semiconductor to optical link as claimed in claim 1 wherein the curable gel includes cellulose butyrate acetate.

4. A semiconductor to optical link as claimed in claim 1 wherein the curable gel includes poly methyl methacrylate.

5. A semiconductor to optical link as claimed in claim 1 wherein the curable gel includes cyanoacrylate.

6. A semiconductor to optical link as claimed in claim 1 wherein the header includes a ceramic.

7. A semiconductor to optical link as claimed in claim 1 wherein the header includes a semiconductor material with a metal layer preferentially deposited thereon.

8. A semiconductor to optical link comprising:

a header defining an axial direction and having dimensions transverse to the axial direction, the header includes first and second metal leads on one side thereof;

a vertical cavity surface emitting laser having an optical output area defined in a first surface and first and second electrical connections on a second surface opposite the first surface, the vertical cavity surface emitting laser being fixed to the header with the second surface in abutting engagement with the header and the first and second electrical contacts of the vertical cavity surface emitting laser being connected to the first and second metal leads of the header, the first surface being positioned substantially perpendicular to the axial direction defined by the header, the transverse dimensions of the header being approximately the same size as the second surface of the vertical cavity surface emitting laser;

an elongated optical fiber having an end defining an optical input of the fiber, the end of the optical fiber having dimensions transverse to a longitudinal dimension of the optical fiber approximately the same size as the first surface of the vertical cavity surface emitting laser; and a curable gel fixing the end of the optical fiber to the first surface of the vertical cavity surface emitting laser, with the optical input of the optical fiber in alignment with the optical output area of the vertical cavity surface emitting laser so as to form an optical junction therebetween.

9. A semiconductor to optical link comprising:

a header and semiconductor assembly including a header unit defining an axial direction and having dimensions transverse to the axial direction, the header unit having a plurality of leads, and a plurality of semiconductor components each having an optical input/output area defined in a first surface and first and second electrical connections, the plurality of semiconductor components being fixed in abutting engagement with the header unit with the first surface directed outwardly away from the header unit and substantially perpendicular to the axial direction defined by the header unit, the transverse dimensions of the header unit being approximately the same size as the first surfaces of the plurality of semiconductor components, and the first and second electrical connections of each the plurality of semiconductor components being connected to the plurality of leads of the header unit;

a plurality of elongated optical fibers each having an end defining an optical input/output of the fiber, the ends of the optical fibers having dimensions transverse to a longitudinal dimension of the optical fiber approximately the same size as the first surfaces of the plurality of semiconductor components; and a curable gel fixing one each of the ends of the optical fibers to one each of the first surfaces of the semiconductor components, with the optical input/output of each optical fiber in alignment with the optical input/output area of the semiconductor component so as to form an optical junction therebetween.

10. A semiconductor to optical link as claimed in claim 8 wherein the optical fiber is a single mode optical fiber with a core dimension in the range of approximately 1 micron to 6 microns and a total diameter of approximately 125 microns.

* * * * *